(12) United States Patent
Mizuno

(10) Patent No.: US 8,816,269 B2
(45) Date of Patent: Aug. 26, 2014

(54) REFLECTIVE OPTICAL SCALE FOR ENCODER AND REFLECTIVE OPTICAL ENCODER

(71) Applicant: Canon Kabushiki Kaisha, Tokyo (JP)

(72) Inventor: Hiroshi Mizuno, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 13/651,889

(22) Filed: Oct. 15, 2012

(65) Prior Publication Data
US 2013/0112860 A1    May 9, 2013

(30) Foreign Application Priority Data

Nov. 7, 2011   (JP) .................................. 2011-243971

(51) Int. Cl.
*G01D 5/34*    (2006.01)
*G01D 5/36*    (2006.01)
*G01D 5/347*   (2006.01)
*G02B 1/11*    (2006.01)
*G02B 5/08*    (2006.01)

(52) U.S. Cl.
CPC .............. *G01D 5/34707* (2013.01); *G02B 1/11* (2013.01); *G02B 5/0816* (2013.01)
USPC .................................. 250/231.13; 250/237 G

(58) Field of Classification Search
CPC ..... G01D 5/34707; G02B 1/11; G02B 5/0816
USPC ........................... 250/231.13–231.19, 237 G
See application file for complete search history.

(56) References Cited

U.S. PATENT DOCUMENTS 8,488,131 B2 * 7/2013 Horiguchi ..................... 356/616

FOREIGN PATENT DOCUMENTS

| JP | 06-288717   | 10/1994 |
| JP | 07-248207   | 9/1995  |
| JP | 2004-020283 | 1/2004  |
| JP | 2004-028862 | 1/2004  |
| JP | 2008-170286 | 7/2008  |
| JP | 2009-281990 | 12/2009 |
| WO | 2009/031608 | 3/2009  |

* cited by examiner

*Primary Examiner* — Thanh Luu
(74) *Attorney, Agent, or Firm* — Fitzpatrick, Cella, Harper & Scinto

(57) ABSTRACT

A reflective optical scale for an encoder, in which a first region and a second region are alternately arranged on an underlying member, wherein the first region has a reflecting member on the underlying member, a layer made up of a first material, and a layer made up of a second material, the second region has the layer made up of the second material, the first and the second material have transparency, the first material has a lower refractive index of the light than the reflecting member and the second material, the second material has a lower refractive index of the light than the underlying member, and optical thicknesses of the first and the second material are set so that a reflectance of the light of the first region is higher than the second region.

5 Claims, 8 Drawing Sheets

F I G. 6A

| | | FIRST EMBODIMENT | FIRST COMPARATIVE EXAMPLE | SECOND COMPARATIVE EXAMPLE |
|---|---|---|---|---|
| CONFIGURATION OF SCALE | UNDERLYING MEMBER | SILICON SUBSTRATE | SILICON SUBSTRATE | SILICON SUBSTRATE |
| | REFLECTING MEMBER | ALUMINUM ALLOY | ALUMINUM ALLOY | ALUMINUM ALLOY |
| | LAYER MADE UP OF FIRST MATERIAL | SILICON OXIDE THICKNESS : 129nm | NONE | NONE |
| | LAYER MADE UP OF SECOND MATERIAL | TITANIUM OXIDE THICKNESS : 94nm | NONE | TITANIUM OXIDE ON ENTIRE SURFACE THICKNESS : 94nm |
| REFLECTANCE [%] | FIRST REGION | 94.1 | 86.3 | 58.8 |
| | SECOND REGION | 1.93 | 34.3 | 1.93 |
| REFLECTANCE RATIO | FIRST REGION / SECOND REGION | 48.8 | 2.52 | 30.5 |

F I G. 6B

| CONFIGURATION OF SCALE | | SECOND EMBODIMENT | THIRD COMPARATIVE EXAMPLE | FOURTH COMPARATIVE EXAMPLE |
|---|---|---|---|---|
| | UNDERLYING MEMBER | CHROMIUM FILM (GLASS SUBSTRATE) | CHROMIUM FILM (GLASS SUBSTRATE) | CHROMIUM FILM (GLASS SUBSTRATE) |
| | REFLECTING MEMBER | ALUMINUM ALLOY | ALUMINUM ALLOY | ALUMINUM ALLOY |
| | LAYER MADE UP OF FIRST MATERIAL | SILICON OXIDE THICKNESS : 129nm | NONE | TITANIUM OXIDE ON ENTIRE SURFACE THICKNESS : 94nm |
| | LAYER MADE UP OF SECOND MATERIAL | TITANIUM OXIDE THICKNESS : 94nm | NONE | |
| REFLECTANCE [%] | FIRST REGION | 94.1 | 86.3 | 58.8 |
| | SECOND REGION | 18.0 | 63.2 | 18.0 |
| REFLECTANCE RATIO | FIRST REGION / SECOND REGION | 5.23 | 1.37 | 3.27 |

F I G. 6C

| | | THIRD EMBODIMENT | FIFTH COMPARATIVE EXAMPLE | SIXTH COMPARATIVE EXAMPLE |
|---|---|---|---|---|
| CONFIGURATION OF SCALE | UNDERLYING MEMBER | TITANIUM FILM (GLASS SUBSTRATE) | TITANIUM FILM (GLASS SUBSTRATE) | TITANIUM FILM (GLASS SUBSTRATE) |
| | REFLECTING MEMBER | ALUMINUM ALLOY | ALUMINUM ALLOY | ALUMINUM ALLOY |
| | LAYER MADE UP OF FIRST MATERIAL | MAGNESIUM FLUORIDE THICKNESS : 136nm | NONE | ALUMINUM OXIDE ON ENTIRE SURFACE THICKNESS : 128nm |
| | LAYER MADE UP OF SECOND MATERIAL | ALUMINUM OXIDE THICKNESS : 128nm | NONE | |
| REFLECTANCE [%] | FIRST REGION | 90.5 | 86.3 | 69.1 |
| | SECOND REGION | 31.0 | 61.8 | 31.0 |
| REFLECTANCE RATIO | FIRST REGION / SECOND REGION | 2.92 | 1.40 | 2.23 |

REFLECTIVE OPTICAL SCALE FOR ENCODER AND REFLECTIVE OPTICAL ENCODER

BACKGROUND OF THE INVENTION

1. Field of the Invention

The present invention relates to a reflective optical scale for an encoder and a reflective optical encoder.

2. Description of the Related Art

A reflective optical encoder used to obtain position information includes a reflective optical scale, a light source such as an LED which irradiates this scale with light, and a light detector which detects reflected light from this scale. On the reflective optical scale, reflecting regions and non-reflecting regions are alternately arranged, and the reflectance of light on the reflecting region is higher than that of light on the non-reflecting region. Thus, reflected light from the scale generates a fringe-like image (interference fringes) on the light detector arranged to oppose this scale. The light detector detects a phase shift of the fringes caused when the position of the scale moves in the length measurement direction. The reflective optical encoder processes displacement information of the position of the scale according to the detected phase shift of the interference fringes, thus obtaining position information.

One of methods of enhancing detection accuracy of the fringes using the reflected light from the scale is to increase the contrast (density pattern) of the fringes. Thus, incorrect detection of the light detector can be prevented, and the detection accuracy can be improved. Japanese Patent Laid-Open No. 2004-20283 discloses a scale which has a silicon substrate and convex portions periodically formed on the silicon substrate, and in which each convex portion has a silicon oxide film and a monocrystalline silicon layer formed on the silicon oxide film. According to Japanese Patent Laid-Open No. 2004-20283, fringes formed by light reflected by concave portions and the convex portions can be detected. Also, Japanese Patent Laid-Open No. 2008-170286 discloses a scale in which metal layers (reflecting regions) and black underlying layers (non-reflecting regions) are arranged in a grid pattern, and are covered by an antireflection film having an intermediate refractive index of light between those of these films and layers. According to Japanese Patent Laid-Open No. 2008-170286, this antireflection film does not provide any antireflection function of light for the reflecting regions, and absorbs light for the non-reflecting regions, thus increasing the contrast of fringes generated by reflected light. Furthermore, Japanese Patent Laid-Open No. 2004-28862 discloses a scale in which reflective gratings are formed on reflecting regions of the reflecting regions and non-reflecting regions on an antireflection film formed on a transparent substrate. According to Japanese Patent Laid-Open No. 2004-28862, a reflected light amount from portions other than the reflective gratings of a light-receiving amount of a detector, especially, an unnecessary light amount reflected from the transparent substrate is reduced, thus allowing a detection signal to be generated with high accuracy.

SUMMARY OF THE INVENTION

In the scale disclosed in Japanese Patent Laid-Open No. 2004-20283, since each concave portion is formed of a silicon substrate and each convex portion is formed on monocrystalline silicon, it is not easy to assure a reflectance of light as high as that detectable by the light detector in a wavelength range of light when an LED is used as the light source. In the scale disclosed in Japanese Patent Laid-Open No. 2008-170286, since the metal films (reflecting regions) are also covered by the antireflection film, it is difficult to completely prevent a reflectance drop of light on these regions. In the scale disclosed in Japanese Patent Laid-Open No. 2004-28862, the reflectances of light on the reflecting and non-reflecting regions are not disclosed.

The present invention provides a technique advantageous to prevent incorrect detection of a light detector by increasing the contrast of an image generated by reflected light from a scale.

One of the aspects of the present invention provides a reflective optical scale for an encoder, in which a first region and a second region are alternately arranged on an underlying member, wherein the first region has a reflecting member arranged on the underlying member, a layer which is arranged on the reflecting member and is made up of a first material, and a layer which is arranged on the layer made up of the first material and is made up of a second material, the second region has the layer which is arranged on the underlying member and is made up of the second material, the first material and the second material have transparency with respect to light of a wavelength $\lambda$, the first material has a lower refractive index of the light than the reflecting member and the second material, the second material has a lower refractive index of the light than the underlying member, and optical thicknesses of the first material and the second material are set so that a reflectance of the light of the first region is higher than the second region.

Further features of the present invention will become apparent from the following description of exemplary embodiments with reference to the attached drawings.

BRIEF DESCRIPTION OF THE DRAWINGS

FIGS. 6A to 6C are tables which compare effects of the reflective optical scale of the present invention.

DESCRIPTION OF THE EMBODIMENTS

First Embodiment

Figure 1A:
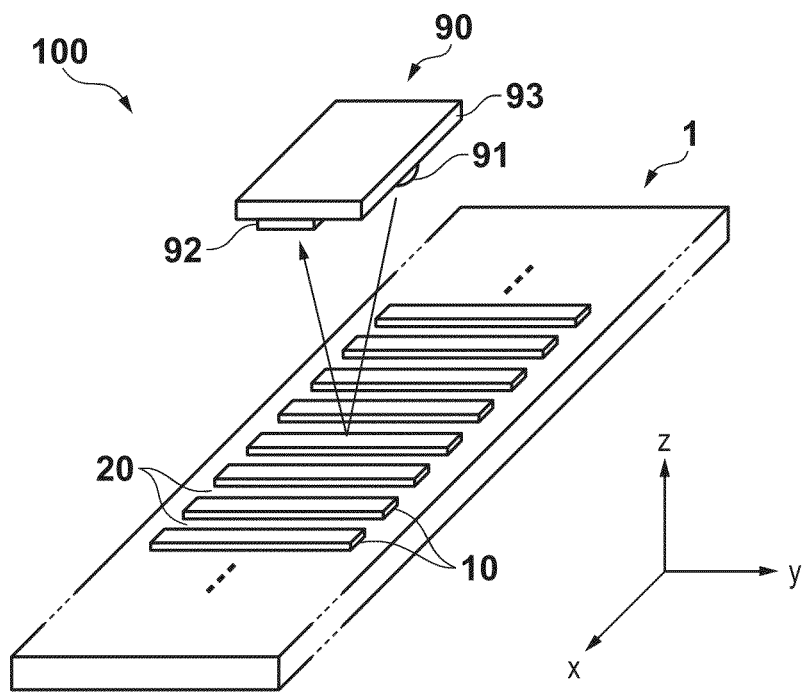
FIGS. 1A and 1B are schematic views for explaining the arrangement of a reflective optical encoder.
Figure 1B:
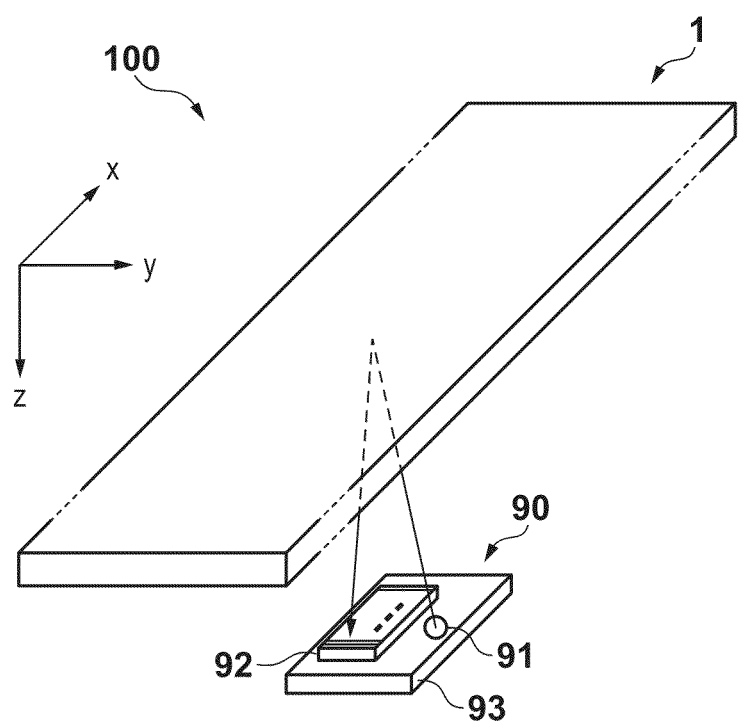
Figure 2A:
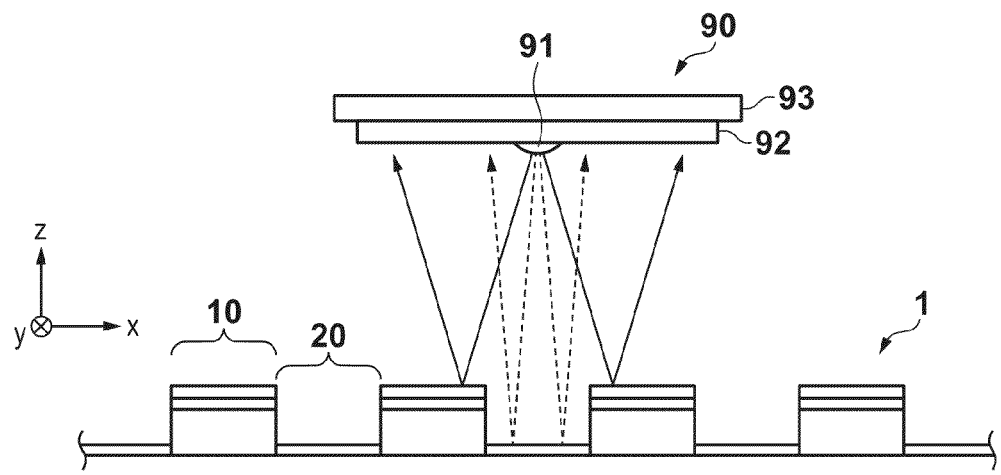
FIGS. 2A and 2B are views for complementing the explanation of the arrangement of the reflective optical encoder.
Figure 2B:
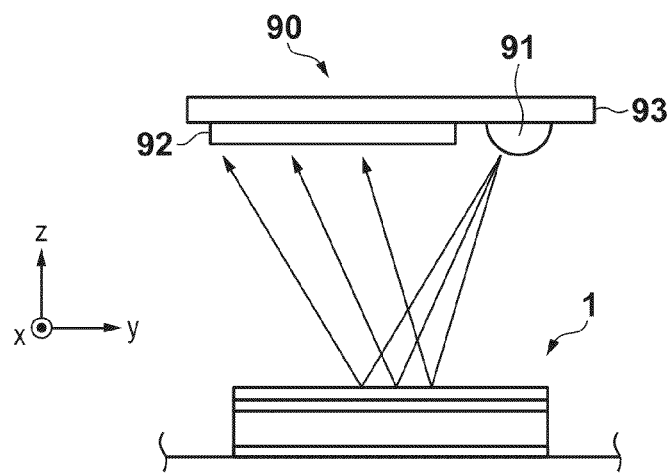

A reflective optical scale 1 for an encoder according to the first embodiment of the present invention will be described below with reference to FIGS. 1A to 6C. FIGS. 1A and 1B are schematic views for explaining a reflective optical encoder 100. The reflective optical encoder 100 includes a reflective optical scale 1 and detection head 90. The reflective optical scale 1 and detection head 90 can be arranged to oppose each other. In FIG. 1A, the reflective optical scale 1 is illustrated at a lower position, and the detection head 90 is illustrated at an upper position. In FIG. 1B, the reflective optical scale 1 is illustrated at an upper position, and the detection head 90 is illustrated at a lower position. The detection head 90 includes a light source 91, a light detector 92, and a detection substrate 93 including them. The light source 91 is, for example, a point light source LED which has a small light-emitting surface and can emit light of a single wavelength $\lambda$. In the following embodiments, a case will be examined wherein the light source 91 is an infrared LED having a wavelength $\lambda \approx 850$ nm. The light source 91 may include a collimator lens which can collimate emitted light into parallel light. The light detector 92 can be configured by arranging, for example, a plurality of photodiodes at predetermined intervals. The light detector 92 may include a peripheral circuit which converts or amplifies output signals of the plurality of photodiodes. FIGS. 2A and 2B are plan views of the reflective optical encoder 100 when viewed from other angles.

Figure 3A:
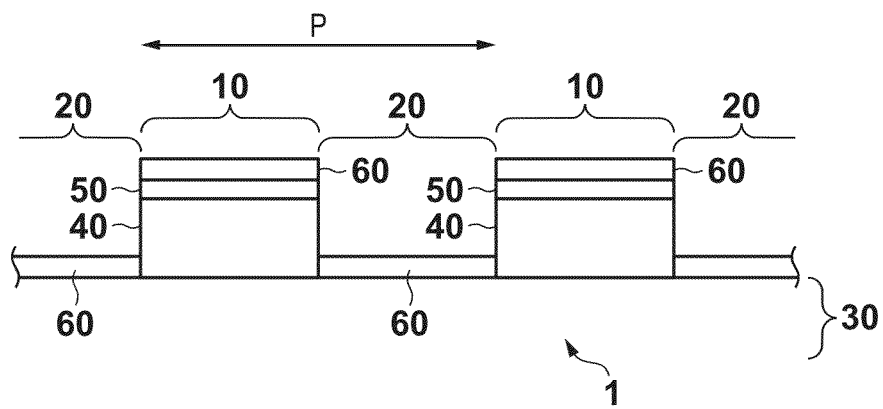
FIGS. 3A to 3C are views for explaining an example of the arrangement of a reflective optical scale of the present invention.
Figure 4:
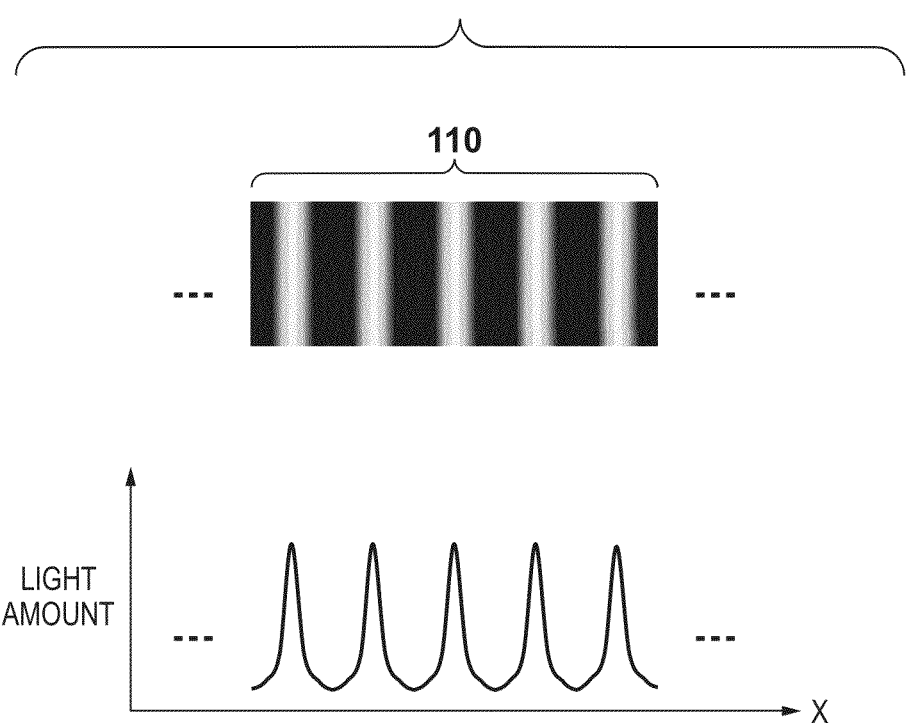
FIG. 4 is a view for explaining an image of light reflected by the reflective optical scale.

FIG. 3A shows the reflective optical scale 1 according to the first embodiment of the present invention. The reflective optical scale 1 can be configured by alternately arranging first regions 10 and second regions 20 on an underlying member 30. Each first region 10 has a higher reflectance of light of the wavelength $\lambda$ than the second region 20. Thus, light, which is emitted by the light source 91 and is reflected by the reflective optical scale 1, generates a fringe-like image 110, which is exemplified in FIG. 4, on the detection head 90 which is arranged to oppose the reflective optical scale 1 (more specifically, on the light detector 92). FIG. 4 also includes graph which shows light amounts corresponding to the image 110. In this case, when the reflective optical scale 1 relatively moves in an x-axis direction (in the length measurement direction) with respect to the detection head 90, the fringe-like image 110 can be shifted by a distance twice the moving distance of the scale 1. Therefore, when the first regions 10 and second regions 20 included in the reflective optical scale 1 are arranged at pitches P, the plurality of photodiodes included in the light detector 92 need only be arranged at, for example, pitches 2P. Thus, the light amounts (FIG. 4) of the image 110 of reflected light can be detected by the light detector 92. Note that since the relationship between the pitches of the first and second regions 10 and 20 and those of the fringe-like image changes in correspondence with a distance of the light source 91 and the like, the arrangement pitch of the photodiode is not limited to 2P.

The surface of the underlying member 30 desirably has light absorbency in the wavelength range of the light source 91 of the wavelength $\lambda$. As the underlying member 30, for example, a monocrystalline silicon substrate can be used. A thickness of a standard wafer used in a semiconductor device manufacturing process falls within a range from 600 to 750 $\mu$m, and light emitted by the light source 91 does not transmit through this silicon substrate and do not cause any incorrect operation of the encoder 100 and the like. A refractive index of light ($\lambda \approx 850$ nm; the same applies to the following description) of the silicon substrate is about 3.83.

As each reflecting member 40, for example, a metal material having reflectivity such as aluminum or an aluminum alloy can be used. The aluminum alloy prepared by doping silicon, copper, or the like in aluminum can be used. The reflecting members 40 is formed by forming an aluminum or aluminum alloy layer on the underlying member 30 by sputtering or the like, and etching portions corresponding to the second regions 20 of the first and second regions 10 and 20 to expose the underlying member 30. In this embodiment, as each reflecting member 40, an aluminum-silicon member prepared by doping silicon in aluminum at about 1% was used. A refractive index of light of the aluminum-silicon member is about 2.08. Each reflecting member 40 desirably has a refractive index of light smaller than that of the underlying layer 30.

Each first region 10 includes the reflecting member 40 arranged on the underlying member 30, a layer 50 which is arranged on the reflecting member 40 and is made up of a first material, and a layer 60 which is arranged on the first material layer 50 and is made up of a second material. Each second region 20 includes the layer 60 which is arranged on the underlying member 30 and is made up of the second material. The first and second materials have transparency with respect to light of the wavelength $\lambda$. A refractive index of light of the first material is required to be smaller than those of the reflecting member 40 and second material, and a refractive index of light of the second material is required to be smaller than that of the underlying member 30.

As the first material, for example, silicon oxide or magnesium fluoride can be used. In this embodiment, silicon oxide was used. A silicon oxide layer (the first material layer 50) is formed on the reflecting member 40 after the reflecting member 40 is formed on each first region 10 on the underlying member 30. As this formation method, for example, a silicon oxide layer is formed by sputtering or the like, and portions corresponding to the second regions 20 of the first and second regions 10 and 20 are etched, thereby forming the silicon oxide layers (first material layers 50) on the reflecting members 40. As another formation method, a silicon oxide layer is formed on an aluminum or aluminum alloy layer used as the reflecting member, and these layers are etched to form the reflecting members 40 and silicon oxide layers 50. A refractive index of light of silicon oxide is about 1.45.

As the second material, for example, a material such as titanium oxide, tantalum oxide, zirconium oxide, niobium oxide, or aluminum oxide or a mixed material of lanthanum oxide and titanium oxide can be used. In this embodiment, titanium oxide was used. A titanium oxide layer (second material layer 60) can be formed by, for example, sputtering or the like on the first and second regions 10 and 20 after the reflecting member 40 is formed on the underlying member 30. A refractive index of light of titanium oxide is about 2.25.

Figure 5:
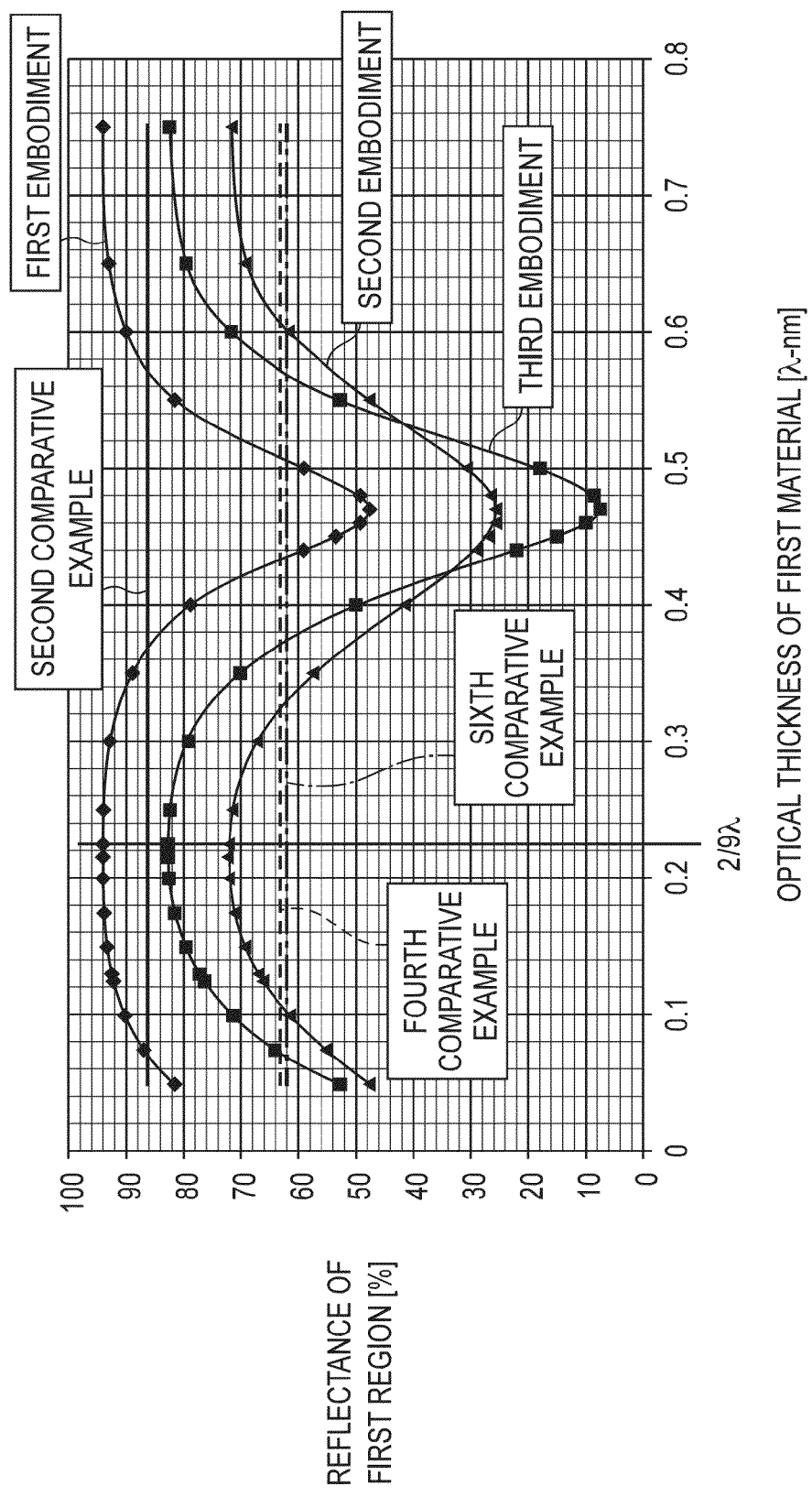
FIG. 5 is a graph prepared by plotting the relationship between the optical thickness of a first material and the reflectance of light of a first region.

Optical thicknesses (products of refractive indices and film thicknesses) of the first and second materials can be set so that the reflectance of light of the wavelength $\lambda$ of each first region 10 is higher than the second region 20. FIG. 5 shows a simulation result by plotting the relationship between the optical thickness of the first material and the reflectance of the first region while the abscissa plots the optical thickness of the first material and the ordinate plots the reflectance of the first region. In FIG. 5, the relationships of the second embodiment, third embodiment, and comparative examples (to be described later) are also plotted. According to this plot graph, the first material layer 50 can most effectively reflect incoming light by each first region 10 when its optical thickness falls within a range of $2\lambda/9 \pm \lambda/9$. Therefore, an optimal value of the thickness of the layer 50 made up of silicon oxide as the first material is 130 nm. On the other hand, the second material layer 60 can effectively prevent reflection of incoming light by each second region 20 when its optical thickness falls within a range of $\lambda/4 \pm \lambda/4$. Especially, when the optical thickness of the second material falls within a range of $\lambda/4 \pm \lambda/8$, reflection of light can be more effectively prevented. This effect is obtained when light reflected by the surface of the second material layer 60 and light reflected by an interface between the underlying member 30 and second material layer 60 cancel each other in opposite phases in the second region 20. Therefore, an optimal value of the thickness of the layer 60 made up of titanium oxide as the second material is 94 nm. As for the first and second materials and their optical thicknesses, the second material and its optical thickness can be determined first from a condition that can effectively prevent reflection of light on each second region 20. After that, the first material and its optical thickness can be determined based on the determined result from a reflection condition of light on each first region 10.

In this way, layers made up of inorganic dielectric members of two types can be formed on the reflecting member 40 of each first region 10, and a layer made up of an inorganic dielectric member of one type can be formed on the underlying member 30 on each second region 20. The layer made up of the inorganic dielectric member of one type can obtain one of a light reflecting layer or antireflection layer of light. Thus, the present invention prepares the first and second materials, and obtains both the light reflecting layer and antireflection layer of light by forming inorganic dielectric layers on the first and second regions 10 and 20. That is, the layer made up of the inorganic dielectric members of two types was formed on each first region 10 to function as a light reflecting layer. Also, the layer made of the inorganic dielectric member of one type was formed on each second region 20 to function as an antireflection layer of light. Thus, the reflectance of light of each first region 10 can be set to be high, and that of light of each second region 20 can be set to be low.

FIG. 6A is a table showing comparison results of the reflective optical scale 1 of this embodiment with first and second comparative examples. FIG. 6A shows the scale configuration (underlying member, reflecting member, and the like), the reflectances and reflectance ratio (reflectance of first region/reflectance of second region) of the first and second regions in correspondence with this embodiment and first and second comparative examples. In the first comparative example, the same underlying member 30 and reflecting member 40 as those of this embodiment are formed, and the first material layer 50 and second material layer 60 are not formed. In the second comparative example, the same underlying member 30 and reflecting member 40 as those of this embodiment are formed, and a layer (an optical thickness=λ/4 and a thickness=94 nm) made up of titanium oxide as the second material is formed on the overall surface of the scale including these members.

In this embodiment, the reflectance of the first region 10 increases, that of the second region 20 decreases, and the reflectance ratio exhibits an approximately ×20 higher value compared to the first comparative example in which the first material layer 50 and second material layer 60 are not formed. In the second comparative example which adopts the antireflection arrangement for the second region using the layer of titanium oxide as the second material, the reflectance of the first region is impaired. For this reason, in this embodiment, the reflectance ratio exhibits an approximately ×1.6 higher value compared to the second comparative example. That is, using the reflective optical scale 1 of this embodiment, the contrast of an image generated on the light detector 92 by reflected light from the scale 1 can be increased.

Second Embodiment

Figure 3B:
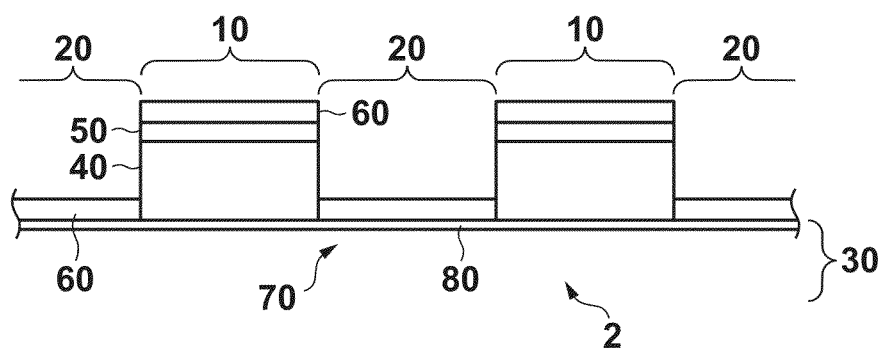

As another example of the underlying member 30, a member prepared by forming a film including at least one of chromium, titanium, nickel, iron, and platinum on a substrate having light transparency may be used. In this case, it is required to form a metal film as thick as incoming light from the light source 91 is not transmitted. FIG. 3B shows a reflective optical scale 2 according to the second embodiment of the present invention. In this embodiment, as the underlying member 30, a member prepared by forming a metal film 80 of chromium on a glass substrate 70 was used. The metal film 80 of chromium was formed to have a thickness of 100 nm or more. Therefore, light emitted by the light source 91 is never transmitted through this metal film 80, and does not cause any incorrect operation of the encoder 100 or the like. A refractive index of light of the metal film 80 of chromium is about 4.31.

FIG. 6B is a table showing comparison results of the reflective optical scale 2 for an encoder of this embodiment with third and fourth comparative examples, as in the aforementioned first embodiment.

In the third comparative example, the same underlying member 30 and reflecting member 40 as those of this embodiment are formed, and the first material layer 50 and second material layer 60 are not formed. In the fourth comparative example, the same underlying member 30 and reflecting member 40 as those of this embodiment are formed, and a layer (an optical thickness=λ/4 and a thickness=94 nm) made up of titanium oxide as the second material is formed on the overall surface of the scale including these members.

In this embodiment, the reflectance of the first region 10 increases, that of the second region 20 decreases, and the reflectance ratio exhibits an approximately ×3.8 higher value compared to the third comparative example in which the first material layer 50 and second material layer 60 are not formed. In the fourth comparative example which adopts the antireflection arrangement for the second region using the layer of titanium oxide as the second material, the reflectance of the first region is impaired. For this reason, in this embodiment, the reflectance ratio exhibits an approximately ×1.6 higher value compared to the fourth comparative example. That is, using the reflective optical scale 2 of this embodiment, the contrast of an image generated on the light detector 92 by reflected light from the scale 2 can be increased.

Third Embodiment

Figure 3C:
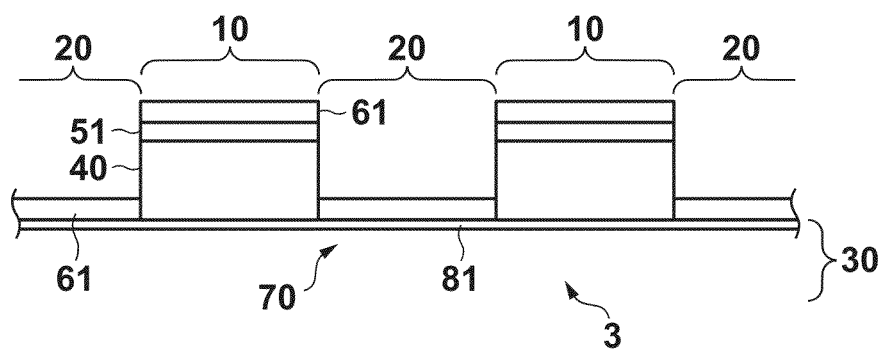

When a member prepared by forming a metal film on a glass substrate or the like is used as another example of the underlying member 30 as in the second embodiment, for example, a material having a high refractive index such as nickel, iron, or platinum can also be selected as a material of the metal film. FIG. 3C shows a reflective optical scale 3 for an encoder according to the third embodiment of the present invention. In this embodiment, a member prepared by forming a metal film 81 of titanium on a glass substrate 70 was used as the underlying member 30. The metal film 81 of titanium was formed to have a thickness of 100 nm or more. Compared to the second embodiment in which the metal film of chromium is formed, the light transmittance can be suppressed to 0.1% or less. Therefore, light emitted by the light source 91 is never transmitted through this metal film 81, and does not cause any incorrect operation of the encoder 100 or the like. A refractive index of light of the metal film 81 of titanium is about 3.24.

Also, in this embodiment, magnesium fluoride was used as the first material, and aluminum oxide was used as the second material. A layer 51 of magnesium fluoride as the first material is formed on the reflecting member 40 after the reflecting member 40 is formed using an aluminum alloy on the underlying member 30. As this formation method, for example, a magnesium fluoride layer is formed by sputtering or the like, and portions corresponding to the second regions 20 of the first and second regions 10 and 20 are etched, thus forming the magnesium fluoride layers 51 on the reflecting members 40. A refractive index of magnesium fluoride is about 1.37. Therefore, an optimal value of a thickness of the layer 51 of magnesium fluoride as the first material is 136 nm. A layer 61 of aluminum oxide as the second material is formed by, for example, sputtering or the like on the underlying member 30 on which the reflecting member 40 is formed. A refractive index of aluminum oxide is about 1.66. Therefore, an optimal value of a thickness of the layer 61 of aluminum oxide as the second material is 128 nm.

FIG. 6C is a table showing comparison results of the reflective optical scale 3 of this embodiment with fifth and sixth comparative examples, as in the aforementioned first and second embodiments.

In the fifth comparative example, the same underlying member 30 and reflecting member 40 as those of this embodiment are formed, and the first material layer 51 and second material layer 61 are not formed. In the sixth comparative example, the same underlying member 30 and reflecting member 40 as those of this embodiment are formed, and a layer (an optical thickness=$\lambda/4$ and a thickness=128 nm) made up of aluminum oxide as the second material is formed on the overall surface of the scale including these members.

In this embodiment, the reflectance of the first region 10 increases, that of the second region 20 decreases, and the reflectance ratio exhibits an approximately ×2.1 higher value compared to the fifth comparative example in which the first material layer 51 and second material layer 61 are not formed. In the sixth comparative example which adopts the antireflection arrangement for the second region using the layer of aluminum oxide as the second material, the reflectance of the first region is impaired. For this reason, in this embodiment, the reflectance ratio exhibits an approximately ×1.3 higher value compared to the sixth comparative example. That is, using the reflective optical scale 3 of this embodiment, the contrast of an image generated on the light detector 92 by reflected light from the scale 3 can be increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-243971, filed Nov. 7, 2011, which is hereby incorporated by reference herein in its entirety.

What is claimed is:

1. A reflective optical scale for an encoder, in which a first region and a second region are alternately arranged on an underlying member, wherein, the first region has a reflecting member arranged on the underlying member, a layer which is arranged on the reflecting member and is made up of a first material, and a layer which is arranged on the layer made up of the first material and is made up of a second material, the second region has the layer which is arranged on the underlying member and is made up of the second material, the first material and the second material have transparency with respect to light of a wavelength $\lambda$, the first material has a lower refractive index of the light than the reflecting member and the second material, the second material has a lower refractive index of the light than the underlying member, and optical thicknesses of the first material and the second material are set so that a reflectance of the light of the first region is higher than the second region.

2. The scale according to claim 1, wherein the optical thickness of the first material falls within a range of $2\lambda/9\pm\lambda/9$, and the optical thickness of the second material falls within a range of $\lambda/4\pm\lambda/4$.

3. The scale according to claim 1, wherein the underlying member is a member prepared by forming a film containing at least one of chromium, titanium, nickel, iron, and platinum on a silicon substrate or a substrate having transparency with respect to the light.

4. The scale according to claim 1, wherein the reflecting member is an aluminum alloy, the first material is silicon oxide, and the second material is titanium oxide.

5. A reflective optical encoder comprising:

a reflective optical scale for an encoder of claim 1;

a light source configured to irradiate said scale with light of a wavelength $\lambda$; and a light detector configured to detect reflected light of said light source from said scale.

* * * * *